(12) United States Patent
Naccari et al.

(10) Patent No.: US 11,317,102 B2
(45) Date of Patent: Apr. 26, 2022

(54) VIDEO ENCODING AND DECODING

(71) Applicant: British Broadcasting Corporation, London (GB)

(72) Inventors: Matteo Naccari, London (GB); Marta Mrak, London (GB); Saverio Blasi, London (GB); Andre Seixas Dias, London (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 17/044,628

(22) PCT Filed: Mar. 20, 2019

(86) PCT No.: PCT/GB2019/050776
§ 371 (c)(1),
(2) Date: Oct. 1, 2020

(87) PCT Pub. No.: WO2019/193313
PCT Pub. Date: Oct. 10, 2019

(65) Prior Publication Data
US 2021/0168378 A1 Jun. 3, 2021

(30) Foreign Application Priority Data
Apr. 4, 2018 (GB) .................................. 1805569.9

(51) Int. Cl.
*H04N 19/176* (2014.01)
*H04N 19/117* (2014.01)
(Continued)

(52) U.S. Cl.
CPC ......... *H04N 19/176* (2014.11); *H04N 19/117* (2014.11); *H04N 19/46* (2014.11);
(Continued)

(58) Field of Classification Search
CPC .... H04N 19/176; H04N 19/117; H04N 19/46; H04N 19/61; H04N 19/70; H04N 19/82
See application file for complete search history.

(56) References Cited

U.S. PATENT DOCUMENTS 5,067,015 A * 11/1991 Combridge .......... H04N 19/635
375/240.11
8,270,472 B2 * 9/2012 Lai ....................... H04N 19/134
375/240.02
(Continued)

FOREIGN PATENT DOCUMENTS

EP      2048886 A1    4/2009
WO  2010/090630 A1   8/2010

OTHER PUBLICATIONS

United Kingdom Patent Office Search Report for Application No. GB1805569.9 dated Sep. 20, 2018 (4 pages).
(Continued)

*Primary Examiner* — Jonathan R Messmore
(74) *Attorney, Agent, or Firm* — Michael Best & Friedrich LLP (57) ABSTRACT

The present invention relates to a method of decoding a video bitstream, the method comprising the steps of: receiving a bitstream representing: residual samples produced by subtracting encoder filtered motion compensated prediction samples from image samples; and motion vectors used in forming the motion compensated prediction samples; the encoder filtering process conducted on the motion compensated prediction samples at an encoder having at least one parameter; using said motion vectors to provide motion compensated prediction samples from a previously reconstructed image; decoder filtering said motion compensated prediction samples in accordance with said at least one parameter; and adding said filtered motion compensated prediction samples to said residual samples to reconstruct images. A system and apparatus corresponding to this method are also disclosed.

20 Claims, 4 Drawing Sheets

(51) Int. Cl.
*H04N 19/46* (2014.01)
*H04N 19/61* (2014.01)
*H04N 19/70* (2014.01)
*H04N 19/82* (2014.01)

(52) U.S. Cl.
CPC ............ *H04N 19/61* (2014.11); *H04N 19/70* (2014.11); *H04N 19/82* (2014.11)

(56) References Cited

U.S. PATENT DOCUMENTS

| | | | |
|---|---|---|---|
| 2006/0120217 A1* | 6/2006 | Wu | G01V 1/44 367/32 |
| 2006/0171569 A1 | 8/2006 | Budagavi | |
| 2008/0089417 A1* | 4/2008 | Bao | H04N 19/117 375/240.16 |
| 2010/0177822 A1 | 7/2010 | Karczewicz et al. | |
| 2012/0051438 A1 | 3/2012 | Chong et al. | |
| 2012/0320973 A1* | 12/2012 | Xu | H04N 19/14 375/240.03 |
| 2013/0083844 A1 | 4/2013 | Chong et al. | |
| 2015/0382003 A1 | 12/2015 | Gamei et al. | |
| 2018/0332309 A1* | 11/2018 | Jin | H04N 19/117 |

OTHER PUBLICATIONS

International Search Report and Written Opinion for Application No. PCT/GB2019/050776 dated May 31, 2019 (13 pages).

Ye et al., "CE4: L-C smooth ref spat SVC," 21 JVT Meeting, 78, MPEG Meeting, Oct. 20, 2006-Oct. 27, 2006, Hangzhou, China (Joint Video Team of ISO/IEC JTC1/SC29/WG11 and ITU-T SG. 16) No. JVT-U126, Dec. 20, 2006.

* cited by examiner

Figure 1

| Kernel length | Isotropic | Horizontal | Vertical | Diagonal 45 | Diagonal 135 |
|---|---|---|---|---|---|
| 3 | 12, 16, 12 (cross with 12 top, 12 12 16 12 12 pattern) | 20 24 20 | 20 / 24 / 20 | 20 / 24 / 20 (diagonal) | 20 / 24 / 20 (diagonal) |
| 5 (Luma only) | 4,5,5,5,4 / 5,5,8,5,5 / 4,5,5,5,4 (diamond) | 12 13 14 13 12 | 12 / 13 / 14 / 13 / 12 | 12 / 13 / 14 / 13 / 12 (diagonal) | 12 / 13 / 14 / 13 / 12 (diagonal) |

VIDEO ENCODING AND DECODING

CROSS-REFERENCE TO RELATED APPLICATION

This application is the U.S. national stage entry, under 35 U.S.C. § 371, of International Application No. PCT/GB2019/050776, filed Mar. 20, 2019, which claims priority to United Kingdom Patent Application Serial No. 1805569.9, filed on Apr. 4, 2018, the contents of which are incorporated herein by reference in their entirety.

TECHNICAL FIELD

This invention relates to video encoding and decoding, particularly where use is made of a motion compensated prediction.

BACKGROUND

It is a well understood principle in video encoding to form a residual by subtracting from a current frame a prediction based on a preceding (or succeeding) frame. In this, so-called "inter" coding technique, efficiency of coding requires that the prediction be motion compensated. Motion vectors between corresponding blocks in temporally spaced frames are measured at an encoder and delivered in the bitstream to the decoder. There, the decoded motion vectors are used to derive a motion compensated prediction from a previously decoded frame, which is then added to the decoded residuals.

A difficulty has been encountered in the situation where video to be encoded contains motion blur, that is to say where motion in the underlying scene is fast enough for the displacement within a camera shutter aperture to be significant. It is well known that this phenomenon can be modelled as a low pass filter applied to the original image for the whole aperture of the camera shutter. Under the assumption of translational motion, the impulse response of the motion blur filter is proportional to the motion components along the horizontal and vertical directions. Therefore, if motion blur occurs in a given frame, for each coding block the reference frame used (by the decoder) for motion compensation will contain a sharper version of the current block. The overall result is that the sharper edges in the reference frame will still be present in the residuals, resulting in a wider spectrum and less efficient encoding.

One attempt to solve this problem is discussed in US patent application 2006/0171569 where it is suggested to apply a blurring filter to the "sharper" frame before motion vectors are measured. Since a motion vector will then be identified between a block in a motion blurred frame with a corresponding block in a synthetically blurred frame (rather than in a sharp frame), a better motion compensated prediction is expected, with smaller residuals. It is now usual to allow an encoder to select from a number of different frames for use in forming a motion compensated prediction and it is suggested in US2006/0171569 that a synthetically blurred frame is included in the list of frames from which the encoder makes a selection. Use of the blurred frame is signalled to the decoder and since there may be options in the form of the blurring filter which is used by the encoder, it is also necessary to provide the decoder with information about the blurring filter used.

Whilst this prior art use of a blurring filter has some benefits, scope is seen for improvement.

SUMMARY OF THE INVENTION

According to one aspect, a method of decoding a video bitstream comprises the steps of: receiving a bitstream representing: residual samples produced by subtracting encoder filtered motion compensated prediction samples from image samples; and motion vectors used in forming the motion compensated prediction samples; the encoder filtering process conducted on the motion compensated prediction samples at an encoder having at least one parameter; using said motion vectors to provide motion compensated prediction samples from a previously reconstructed image; decoder filtering said motion compensated prediction samples in accordance with said at least one parameter; and adding said filtered motion compensated prediction samples to said residual samples to reconstruct images.

Advantageously, the method comprises the step of analysing the motion compensated prediction samples (or the previously reconstructed image) to infer at least one parameter of the encoder filtering process, said decoder filtering of motion compensated prediction samples being in accordance with said at least one inferred parameter.

In another aspect, a method of encoding video comprises the steps of: forming motion compensated prediction samples using motion vectors and a reconstructed image; conducting an encoder filtering process on the motion compensated prediction samples; subtracting motion compensated prediction samples from image samples to form residual samples; and forming a bitstream representing the residual samples, the motion vectors and optionally at least one parameter of the encoder filtering process.

Advantageously, the method further comprises the step of analysing the motion compensated prediction samples (or a previously reconstructed image) to determine at least one parameter of the encoder filtering process.

Preferably, the step of analysing comprises determining the existence of any predominant direction in the motion compensated prediction samples or the previously reconstructed image to infer a parameter or parameters relating to the existence or detail of any anisotropy in the encoder filtering process.

The encoder and decoder filtering may use a filter aperture defining weighted contributions from a current motion compensated prediction sample and neighbouring motion compensated prediction samples in a block or other set of motion compensated prediction samples. Said or one of said parameters, and preferably said or one of said inferred parameters, may relate to anisotropy of the filter aperture and may be a binary flag denoting isotropy or anisotropy of the filter aperture and/or may denote a predominant direction of an anisotropic filter aperture and preferably one of a set of quantised directions. Said or one of said parameters, and preferably said or one of said inferred parameters, may denote a number of samples in said filter aperture and/or the weight of the contribution of the current motion compensated prediction sample.

In another aspect, a method of decoding a video bitstream comprises the steps of: receiving a bitstream representing: residual samples produced by subtracting motion compensated prediction samples from image samples; and motion vectors used in forming the motion compensated prediction samples; an encoder filtering process conducted at an encoder having at least one parameter; using said motion vectors to provide motion compensated prediction samples from previously reconstructed image samples; and adding said motion compensated prediction samples to said residual samples to reconstruct images; characterized by: conducting an analysis at the decoder to infer at least one parameter of the encoder filtering process; and decoder filtering said motion compensated prediction samples or said previously reconstructed image samples in accordance with said at least one inferred parameter and optionally in accordance with at least one parameter represented in the bitstream.

Advantageously, the step of analysing comprises determining the existence of and/or the direction of any predominant direction in an array of samples to infer a parameter or parameters relating to any anisotropy in the encoder filtering process.

In another aspect, method of encoding a video bitstream comprises the steps of: forming motion compensated prediction samples using motion vectors and reconstructed image samples; subtracting motion compensated prediction samples from image samples to form residual samples; and forming a bitstream representing the residual samples and the motion vectors; characterized by: conducting an analysis to determine at least one parameter of the encoder filtering process which is not represented in the bitstream; and encoder filtering said motion compensated prediction samples or said previously reconstructed image samples in accordance with said at least one parameter.

Advantageously, the step of analysing comprises determining the existence of and/or the direction of any predominant direction in an array of samples to determine a parameter or parameters relating to any anisotropy.

The array of samples may comprise the motion compensated prediction samples or the previously reconstructed image.

The encoder or decoder filtering may use a filter aperture defining weighted contributions from a current sample and neighbouring samples in a block or other set of samples, wherein said or one of said parameters, and preferably said or one of said inferred parameters, relates to anisotropy of the filter aperture and may be a binary flag denoting isotropy or anisotropy of the filter aperture. Said or one of said parameters, and preferably said or one of said inferred parameters, may denote a predominant direction of an anisotropic filter aperture and preferably one of a set of quantised directions. Said or one of said parameters, and preferably said or one of said inferred parameters, may denote a number of samples in said filter aperture and/or the weight of the contribution of the current motion compensated prediction sample.

A computer program product may be provided, adapted to cause programmable apparatus to implement any of these methods.

Apparatus may be provided, configured to implement a method according to any of these methods.

BRIEF DESCRIPTION OF THE DRAWINGS

The invention will now be described by way of example with reference to the accompanying drawings, in which.

DETAILED DESCRIPTION OF CERTAIN EMBODIMENTS

Figure 1:
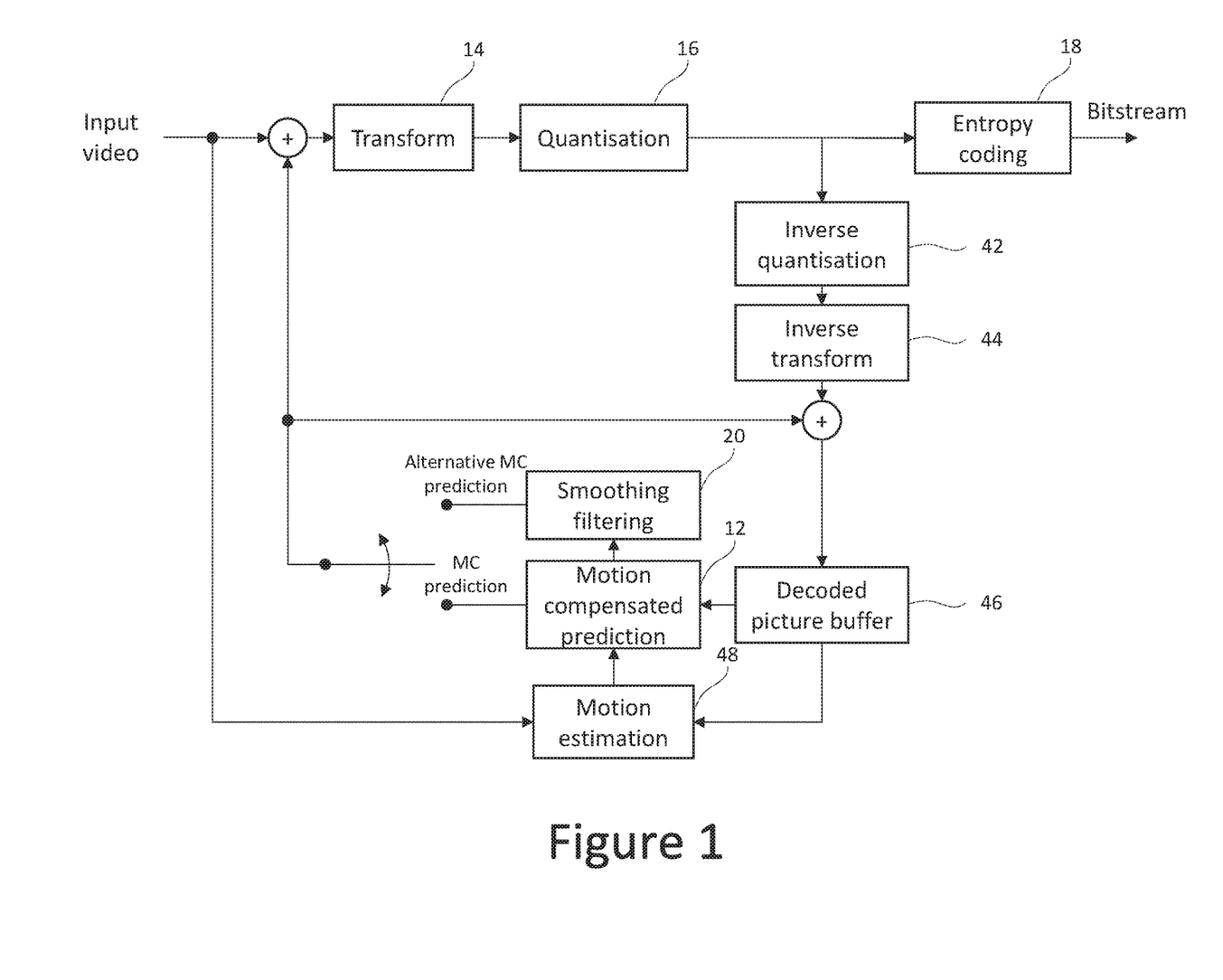
FIG. 1 is a block diagram of an encoder.

There is shown in FIG. 1 an encoder in which a motion compensated prediction is subtracted from the current frame to provide a residual which is transformed 14, quantised 16 and entropy coded 18 to form the encoded bitstream. After transforming 14 and quantisation 16, a current input frame undergoes inverse quantisation 42 and an inverse transform 44 (as is known in the art). The resultant frame is that which will be obtained at the decoder; this is then usable as the base frame for a subsequent frame. This frame is combined with the current MC prediction frame to obtain a reference frame (the decoded picture buffer 46) for which a suitable motion compensated prediction for a subsequent frame can be determined.

When a subsequent input frame is received, this subsequent input frame is combined with the reference frame (from the decoded picture buffer 46) to obtain a motion estimation 48. This determines suitable motion vectors to map blocks within the reference frame to corresponding blocks within the (subsequent) input frame. The reference frame (from the decoded picture buffer 46) and the vectors from the motion estimation 48 are then used to obtain a motion compensated prediction 12, The optimal MC prediction is then subtracted from the subsequent input frame to form a residual which is transformed 14, quantised 16, entropy encoded 18, and transmitted.

To this extent, the encoder of FIG. 1 is conventional.

In accordance with one aspect of this disclosure, the motion compensated prediction is passed to a smoothing filter which provides an alternative, smoothed motion compensated prediction.

So, the general block schema of a hybrid motion compensated predictive video encoder is modified through the addition of a smoothing filter. The smoothing filter operates on predictor P (provided by motion compensation) to obtain the alternative predictor $P_{MCPS}$. Given that the smoothing applied may not be beneficial for all coding blocks, e.g. because P provides already good coding efficiency, a flag is required to be present in the bitstream for its correct decoding. Therefore, at the encoder side for each coding block, residuals are computed with and without smoothing and the mode which minimises the rate distortion Lagrangian cost is eventually selected. The steps in this aspect of the workflow of the encoder are set out below, using—for efficiency—a pseudo code where MCPS denotes the smoothing process.

```
For each inter coding mode m do
    Set P equal to the predictor computed as specified by m
    Apply MCPS to P and set the obtained predictor to P_MCPS
    Compute the residuals R associated with P
    Compute the residuals R_MCPS associated with P_MCPS
    Encode (i.e. apply frequency transformation, quantisation and entropy
coding) R and R_MCPS
        Measure the rate r and r_MCPS associated with R and R_MCPS, respectively
        Compute the distortion D and D_MCPS for R and R_MCPS, respectively
        Compute the Lagrangian cost J and J_MCPS
        If J ≤ J_MCPS write into the bitstream a flag with value zero otherwise, write a
        flag with value one
Endfor
```

The smoothing process may be represented by a spatial filter having an aperture or kernel which defines which samples contribute to the output and with which weighting.

Figure 2:
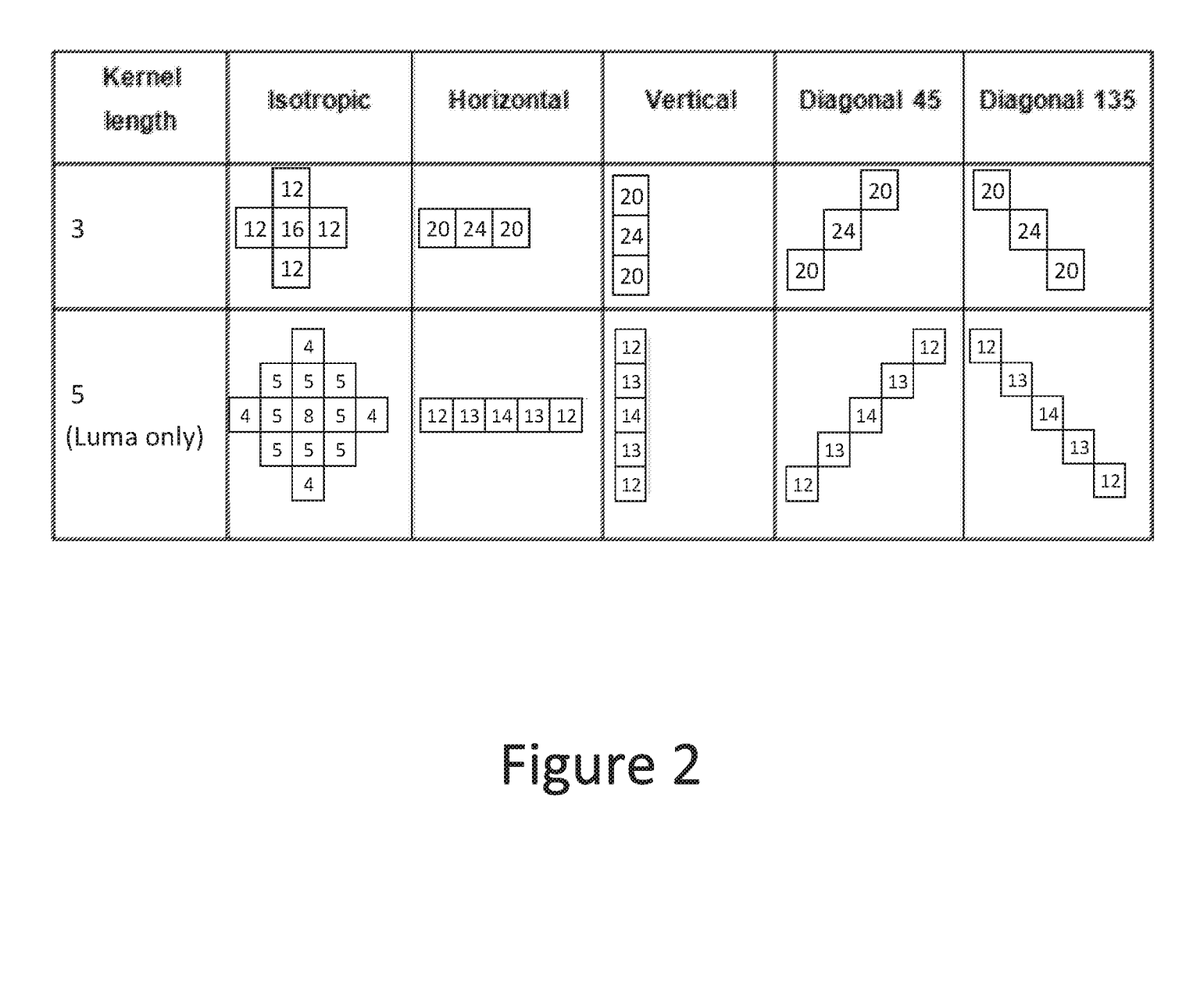
FIG. 2 shows a table of filter kernels which may be used.

In the one example, the smoothing process MCPS uses two types of Mobile Average (MA)-like?] and symmetric kernels. The first type is a 2D and cross-shaped filter while the second corresponds to a 1D filter applied along four directions: horizontal, vertical, 45 and 135 degrees. Other sizes, as well as other filters and other directions, could also be used. Since the first type of filter is a 2D one, operating along the horizontal and vertical dimensions, it will be hereafter denoted as isotropic while the kernels of the second type are hereafter denoted as directional. As mentioned above, the amount of blur depends on the motion activity of different image areas. Accordingly, the size of the different kernels used may vary to further improve the coding efficiency. For the MCPS method, two example sizes for the kernels are used: 3 and 5 where the chroma component only uses size 3. Overall the (exemplary) kernels specified in MCPS are listed in FIG. 2. The smoothing uses integer arithmetic with 6 bit internal precision which leads each kernel to have gain equal to 64. It should be noted that the value of 6 bits for internal accuracy has been chosen in this example to be in line with the same precision used to represent the kernels' coefficients specified in HEVC for motion compensation. Other values may be appropriate for future standards.

In total there are eight different kernels and if the encoder were to perform an exhaustive search for the best mode during rate distortion optimisation, eight full encodings of the resulting residuals should be evaluated in addition to the case of no smoothing. However, the resulting complexity may be prohibitive in some applications. To alleviate the computational burden, and/or to provide the advantages detailed below, the encoder according to this example only selects among the filter type (i.e. isotropic or directional) and related size (i.e. 3 or 5). The remaining parameter, that is to say the directionality, is determined through a preliminary analysis of—in this case—the motion compensated prediction, to identify a predominant direction. This can be done by measuring and analysing gradients.

Figure 3:
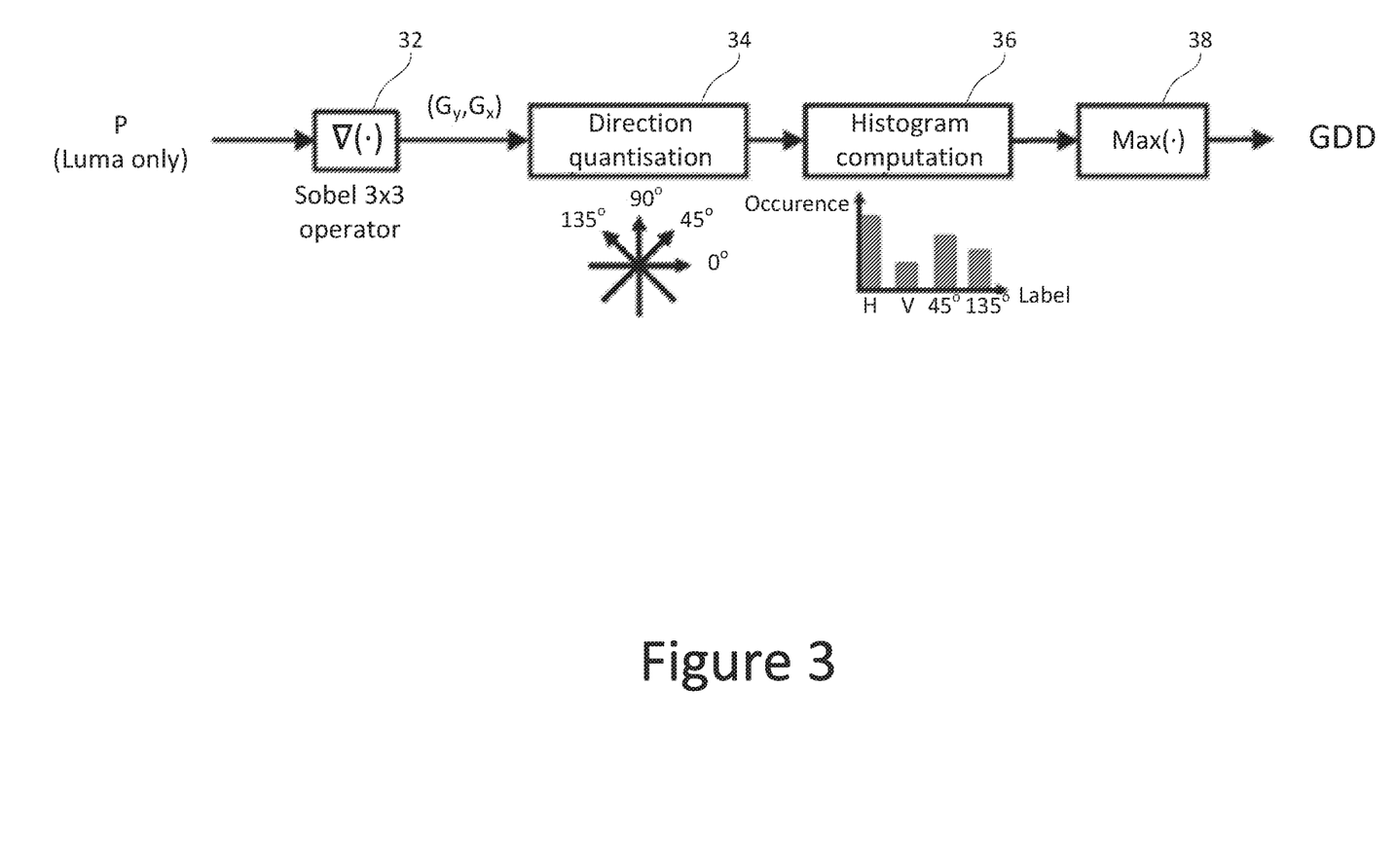
FIG. 3 shows a method of detecting the gradient dominant direction (GDD) of an image.

For example and as shown in FIG. 3, when directional smoothing is selected, the direction along which the kernel should be applied is decided based on the Gradient Dominant Direction (GDD) for a predictor block P. GDD is defined as the direction among the four specified (i.e. horizontal, vertical, diagonal 45 and diagonal 135) which has the highest occurrence over all samples belonging to a given motion compensated predictor P. Assuming a predictor with size N×N, a 3×3 Sobel operator is applied 32 over all samples P(x, y) for x, y=1, . . . , N−1. The operator is preferably not computed over the four outer boundaries of P (i.e. top, bottom, left and right) so that padding is avoided and 4× N−4 operations can be omitted. The operator is applied both horizontally and vertically to obtain $G_x$ and $G_y$. The direction where the gradient vector is pointing forms an angle α with the horizontal given as:

$$\alpha = \arctan\left(\frac{-G_y}{G_x}\right)$$

Where the sign '−' accounts for the different reference system used in images w.r.t the Cartesian 2D plane. The arctan function is approximated with integer arithmetic and 10 bit precision. The angle α is then uniformly quantised 34 into the aforementioned directions with a quantisation step of 45 degrees and dead-zone extent set to 22.5 degrees. After quantisation 34, a four bin histogram is computed 36 and the GDD is determined 38 by the peak of the histogram. For the example depicted in FIG. 3, the horizontal direction is selected as the dominant one.

With the introduction of directional and variable size kernels, the general workflow presented above is extended as follows:

```
Foreach inter coding mode m do
    Set P equal to the predictor computed as specified by m
    Compute the residuals R associated with P
    Encode (i.e. apply frequency transformation, quantisation and entropy
coding) R
    Measure the rate r and distortion D associated with R and compute the
Lagrangian cost J
    Set J_BEST ← J
    Foreach smoothing mode s in { Isotropic or Directional } do
        Foreach kernel size ks in { 3, 5 } do
            If s == Isotropic
                Apply smoothing with cross-shaped filtering with size
ks to get P_MCPS
            Else (s == Directional)
                Compute the GDD d
                Apply smoothing with 1D ks-sized filtering along d to
get P_MCPS
            Endif
            Compute the residuals R_MCPS associated with P_MCPS
            Encode R_MCPS and measure r_MCPS, compute D_MCPS and J_MCPS
            If J_BEST ≤ J_MCPS
                Set J_BEST ← J_MCPS, s_BEST ← s and ks_BEST ← ks
        Endfor
    Endfor
    If J_BEST == J
        Write into the bistream a flag with value '0'
    Else
        Write into the bistream a flag with value '1' and s_BEST and ks_BEST
    Endif
Endfor
```

At the decoder side, the signalled metadata specify information on whether smoothing is applied and, if this is the case, which type and size have been selected. In an HEVC example, metadata may be transmitted on a Coding Unit (CU) basis and refer to three colour components: hence if the metadata signal that MCPS is used, it will be applied to Y, Cb and Cr. The information associated with MCPS is conveyed with three binary flags denoted as follows in Table 1:

TABLE 1

Flag to signal the metadata required by MCPS

| Flag name | Description |
| --- | --- |
| use_mcps_flag | Specifies whether MCPS is used or not |
| mcps_type | Specifies which type of filter is used (isotropic or directional) |
| mcps_size | Specifies which size to use for the smoothing (3 or 5) |

In an HEVC example, each flag is coded with CABAC using one context per flag. Finally, the use of MCPS may be signalled in both the Sequence Parameter Set (SPS) and slice header. The slice level flag is only transmitted if MCPS is enabled at SPS level. The value of the slice level flag is decided after the compression of all CTUs belonging to that slice is completed. If none of the CUs have flag use_mcps_flag equal to 1, then the slice header flag is set to zero or one otherwise. It is worth noting that the value for the slice level flag should be decided in RDO sense but this would require compressing a slice twice which may be prohibitive in terms of encoder complexity. The skilled man will understand that different signalling techniques may be employed, particularly in the context of future standards.

Given the use of integer arithmetic and short size kernels, the additional complexity—the processing required by the core MCPS algorithm—brought by MCPS is quite limited.

Figure 4:
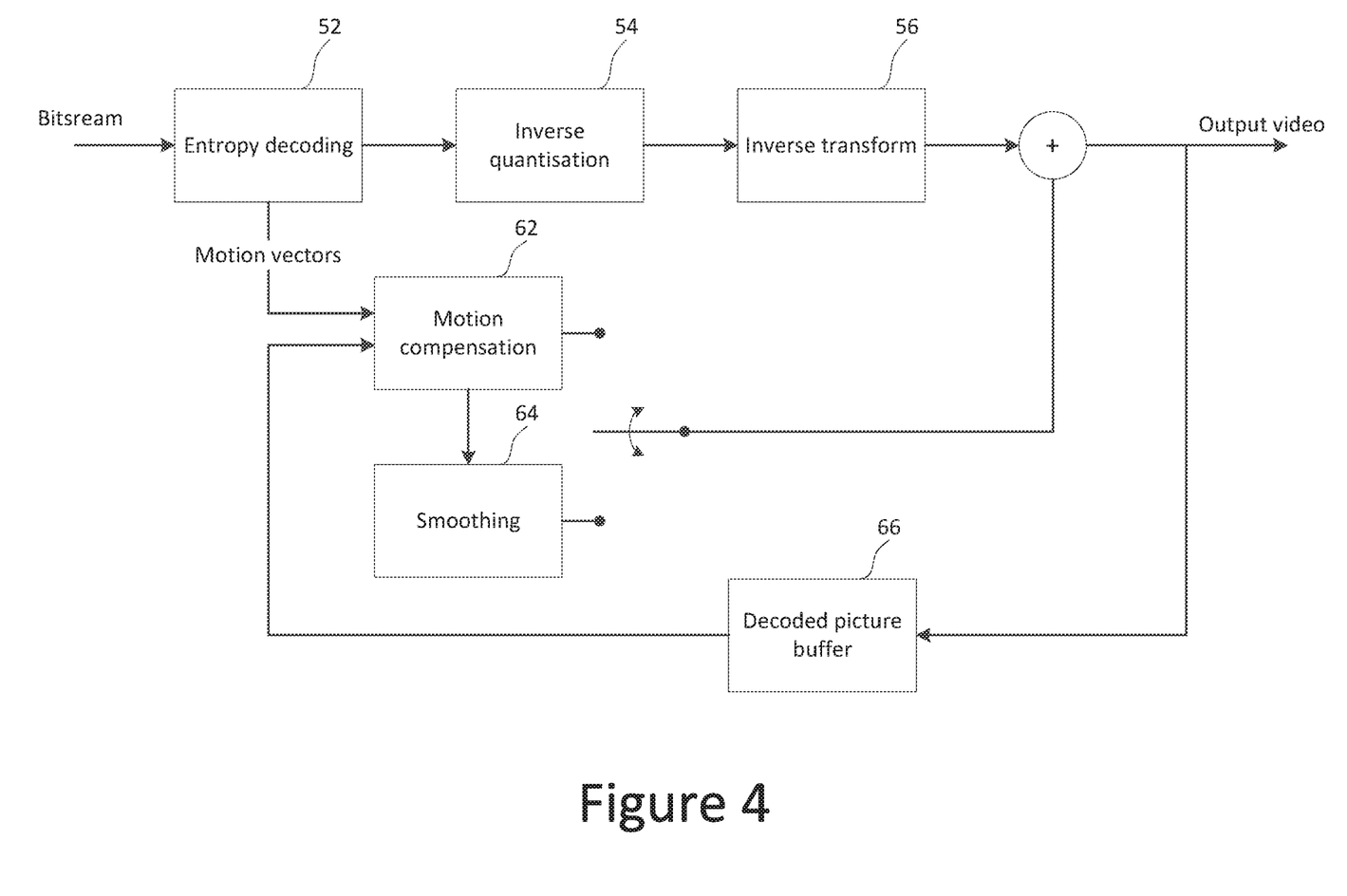
FIG. 4 is a block diagram of a decoder.

At the decoder, as shown for example in FIG. 4, a corresponding smoothing filter 64 operates on the motion compensated prediction 62 to provide an alternative, smoothed prediction for addition to the inverse quantised and inverse transformed residuals.

The decoder determines from the described binary flags: whether smoothing is to be used; whether the filter is isotropic or directional; and what is the filter size. However, in the case where a directional smoothing filter is used, the decoder can infer which direction of filter to be used. This is achieved by applying essentially the same GDD process on the motion compensated prediction.

The important advantage is achieved that, for a minor increase in complexity at the decoder, the overhead imposed on the bitstream by this technique is restricted in this example to three binary flags.

It will be understood that the direction of the filtering can be quantised more finely with a larger number of filter kernels. Since the direction of filtering is inferred at the decoder—rather than signalled in the bitstream In modifications, other filter parameters can be deduced or determined by measurement at the encoder and then inferred at the decoder, so further reducing the amount of information that is required to be signalled in the bitstream.

For example, a process similar to the GDD process could be used to determine the degree of anisotropy in the samples and thus whether an isotropic or directional filter is to be used. More particularly, the described histogram can be used to infer the type of filter to use. A like process would be conducted at the decoder to infer which type of filter to use.

In another example, the size of the filters to use may be based on: the spatial resolution of the sequence; the direction of the filter; or the histogram of gradient directions—in particular the relative quantities of directions.

The number and quality of filters used may be extended, for example: to include additional directions and to include more complex shapes of the kernel. The weight of the coefficients, in particular the centre coefficient in the filter kernels may be selected depending on, for example: visual characteristics of the content.

In appropriate cases, the decoder may be capable of inferring all relevant parameters (including the existence) of the encoding filtering process. There would then be no necessity for a parameter to be represented in the bistream There are other modifications which may have useful application, particularly where computational resources are limited. Such limitations will of course more usually apply at the decoder.

For example: Given that MCPS is an additional filtering cascaded to motion compensation, there could be assumed the potential to combine both motion compensation and smoothing by convolving the associated kernels. In particular, given that there are a number of discrete, different MCPS modes, some precomputed kernels can be stored in memory to be then used later. However, by the description from previous sections and with the reference to FIG. 1, it may be noted that in the case of directional filtering, motion compensation and MCPS cannot be coupled together since GDD is computed over samples obtained after motion compensation. To address this interleaving dependency, the MCPS may use as predictor P the frame obtained by assuming integer pixel motion vector accuracy—and not that that obtained using sub pixel interpolation. The smoothing and sub pixel motion compensation are then combined by convolving the associated kernels. In this case the GDD can be made available after integer precision motion compensation but before sub-pixel motion compensation is applied and therefore $P_{MCPS}$ can be made available after one single filtering step.

At the encoder, the GDD process will then be separated from the smoothing filter and will operate on the output of the decoded picture buffer. Similarly, at the decoder the GDD process will operate on the previously decoded picture.

It will be recognised that current and proposed standards permit block by block selection of reference frames as well as motion vectors. Thus MCPS may be performed separate for each motion vector or each motion vector and reference frame combination.

Various other modifications will be apparent to those skilled in the art, for example, while the detailed description has primarily considered the method being used for blurring, this method could also be used for de-blurring frames. This may involve the use of known blur detection techniques rather than GDD, and a de-blurring filter rather than a smoothing filter. More generally, this invention may be useful for reducing the residuals within any set of images wherein a certain effect is present in only one of the images.

Extensions to the method, for example use for de-blurring may involve a change in the flags sent, where differing flags may be sent depending upon the filter to be applied. Corresponding to the de-blurring example, there may be a choice of flags for: no filter; blurring filter; de-blurring filter (of course this could be extended to include further flags). Features of the application of the filter, for example the calculation of the gradient dominant direction, may remain calculated by the decoder to minimise the transmission cost.

Alternatively, the type of filter to be applied may be inferred from the image being filtered, for example a blurred image may result in a de-blurring filter being applied. There may be a flag that is set only when an unusual filter is to be applied—such as using a blurring filter on an already blurred image.

The filter may also be dependent upon historical data, for example if a filter had been applied to previous blocks or frames, the direction or the magnitude of the filter applied may be selected accordingly.

It should be noticed that the smoothing and related decisions described in this document can be applied to any level of granularity during the encoding loop, be Coding Units or Prediction Units (in the case of the HEVC standard) or any kind of partitioning in other possibly future standards.

Whilst attention has so far in this disclosure been focused on smoothing or other filtering the motion compensated prediction, the ability to select between a wide range of filters—without a corresponding increase in the signalling burden placed on the bitstream—may be of advantage in a case where the smoothing or other filtering is conducted on a reference frame prior to motion compensation, for example as shown in US2006/0171569.

The invention claimed is:

1. A method of decoding a video bitstream comprising the steps of:
   receiving a bitstream representing:
      residual samples produced by subtracting encoder filtered motion compensated prediction samples from image samples; and
      motion vectors used in forming the motion compensated prediction samples;
      the encoder filtering process conducted on the motion compensated prediction samples at an encoder having one or more parameters;
   using said motion vectors to provide motion compensated prediction samples from a previously reconstructed image;
   analysing the motion compensated prediction samples, and/or the previously reconstructed image, to infer at least one of said parameters of the encoder filtering process;
   decoder filtering said motion compensated prediction samples in accordance with said at least one inferred parameter; and
   adding said filtered motion compensated prediction samples to said residual samples to reconstruct images
   wherein the step of analysing comprises determining the existence of, and/or the direction of, any predominant direction in the motion compensated prediction samples and/or the previously reconstructed image.

2. The method of claim 1, wherein the decoder filtering uses a filter aperture defining weighted contributions from a current motion compensated prediction sample and neighbouring motion compensated prediction samples in a block or other set of motion compensated prediction samples.

3. The method of claim 2, wherein said or one of said parameters, and/or said or one of said inferred parameters, relates to anisotropy of the filter aperture and/or wherein said or one of said parameters, and/or said or one of said inferred parameters, is a binary flag denoting isotropy or anisotropy of the filter aperture.

4. The method of claim 3, wherein said or one of said parameters, and/or said or one of said inferred parameters, denotes one or more of:
   a number of samples in said filter aperture; and
   the weight of the contribution of the current motion compensated prediction sample.

5. A method of encoding video comprising the steps of:
   forming motion compensated prediction samples using motion vectors and a reconstructed image;
   conducting an encoder filtering process on the motion compensated prediction samples based on one or more parameters;
   subtracting motion compensated prediction samples from image samples to form residual samples; and
   forming a bitstream representing the residual samples, the motion vectors and optionally at least one parameter of the encoder filtering process;
   wherein the method further comprises: analysing the motion compensated prediction samples and/or a previously reconstructed image to determine at least one of said parameters of the encoder filtering process;
   wherein the step of analysing comprises determining the existence of, and/or the direction of, any predominant direction in the motion compensated prediction samples and/or the previously reconstructed image.

6. The method of claim 5, wherein the encoder filtering uses a filter aperture defining weighted contributions from a current motion compensated prediction sample and neighbouring motion compensated prediction samples in a block or other set of motion compensated prediction samples.

7. The method of claim 6, wherein said or one of said parameters relates to anisotropy of the filter aperture.

8. The method of claim 6, wherein said or one of said parameters, denotes one or more of:
   a predominant direction of an anisotropic filter aperture and one of a set of quantised directions;
   a number of samples in said filter aperture; and
   the weight of the contribution of the current motion compensated prediction sample.

9. A method of decoding a video bitstream comprising the steps of:
   receiving a bitstream representing:
      residual samples produced by subtracting motion compensated prediction samples from image samples; and
      motion vectors used in forming the motion compensated prediction samples;
      an encoder filtering process conducted at an encoder having one or more parameters;
   using said motion vectors to provide motion compensated prediction samples from previously reconstructed image samples; and
   adding said motion compensated prediction samples to said residual samples to reconstruct images;
   characterized by:
   conducting an analysis at the decoder to infer at least one of said parameters of the encoder filtering process; and
   decoder filtering said motion compensated prediction samples or said previously reconstructed image samples in accordance with said at least one inferred parameter and optionally in accordance with at least one parameter represented in the bitstream;
   wherein the analysis comprises determining the existence of, and/or the direction of, any predominant direction in the motion compensated prediction samples and/or the previously reconstructed image.

10. The method of claim 9, wherein the step of analysing comprises determining the existence of and/or the direction of any predominant direction in an array of samples to infer a parameter or parameters relating to any anisotropy in the encoder filtering process.

11. The method of claim 10, wherein the array of samples comprises the motion compensated prediction samples or the previously reconstructed image.

12. The method of claim 9, wherein the decoder filtering uses a filter aperture defining weighted contributions from a current sample and neighbouring samples in a block or other set of samples.

13. The method of claim 12, wherein said or one of said parameters, and/or said or one of said inferred parameters, relates to anisotropy of the filter aperture.

14. The method of claim 12, wherein said or one of said parameters, and/or said or one of said inferred parameters, is a binary flag denoting isotropy or anisotropy of the filter aperture.

15. The method of claim 12, wherein said or one of said parameters, and/or said or one of said inferred parameters, denotes one or more of:
- a predominant direction of an anisotropic filter aperture and preferably one of a set of quantised directions;
- a number of samples in said filter aperture; and
- the weight of the contribution of the current motion compensated prediction sample.

16. The method of claim 2, wherein one of the inferred parameters denotes a predominant direction of an anisotropic filter aperture.

17. The method of claim 16, wherein one of the inferred parameters denotes one of a set of quantised directions.

18. The method of claim 1, wherein the step of analysing comprises determining the direction of any predominant direction in the motion compensated prediction samples, and/or the previously reconstructed image, so as to infer a parameter relating to any anisotropy in the encoder filtering process.

19. The method of claim 1, comprising analysing the motion compensated prediction samples to infer at least one parameter of the encoder filtering process; wherein the step of analysing comprises determining the existence of, and/or the direction of, any predominant direction in the motion compensated prediction samples.

20. The method of claim 1, comprising analysing the previously reconstructed image to infer at least one parameter of the encoder filtering process; wherein the step of analysing comprises determining the existence of, and/or the direction of, any predominant direction in the previously reconstructed image.

* * * * *